Aug. 12, 1969    H. D. HARRIS    3,460,698
FARM CART

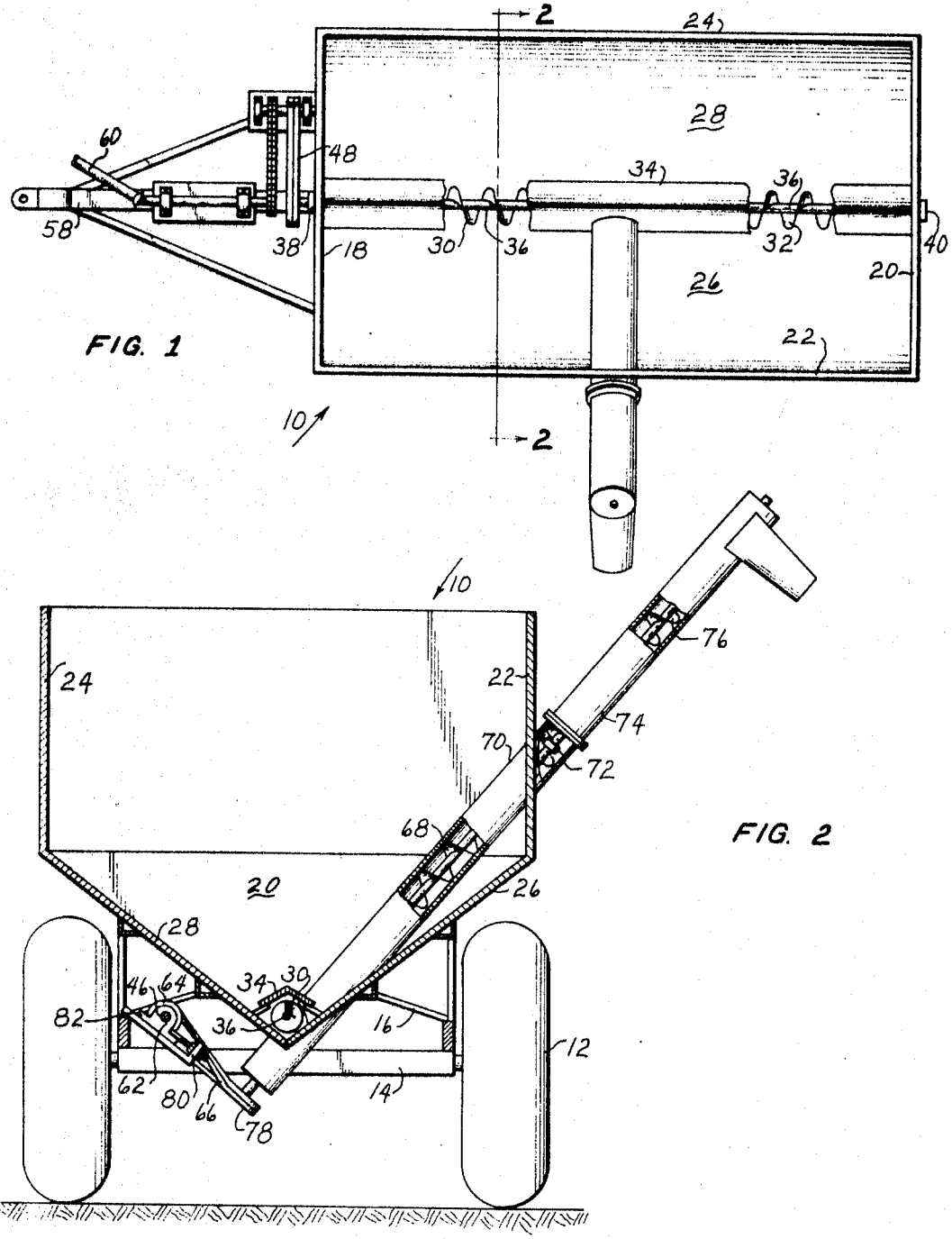

Filed March 4, 1968    3 Sheets-Sheet 2

INVENTOR:
HAROLD D. HARRIS
BY:
Atty.

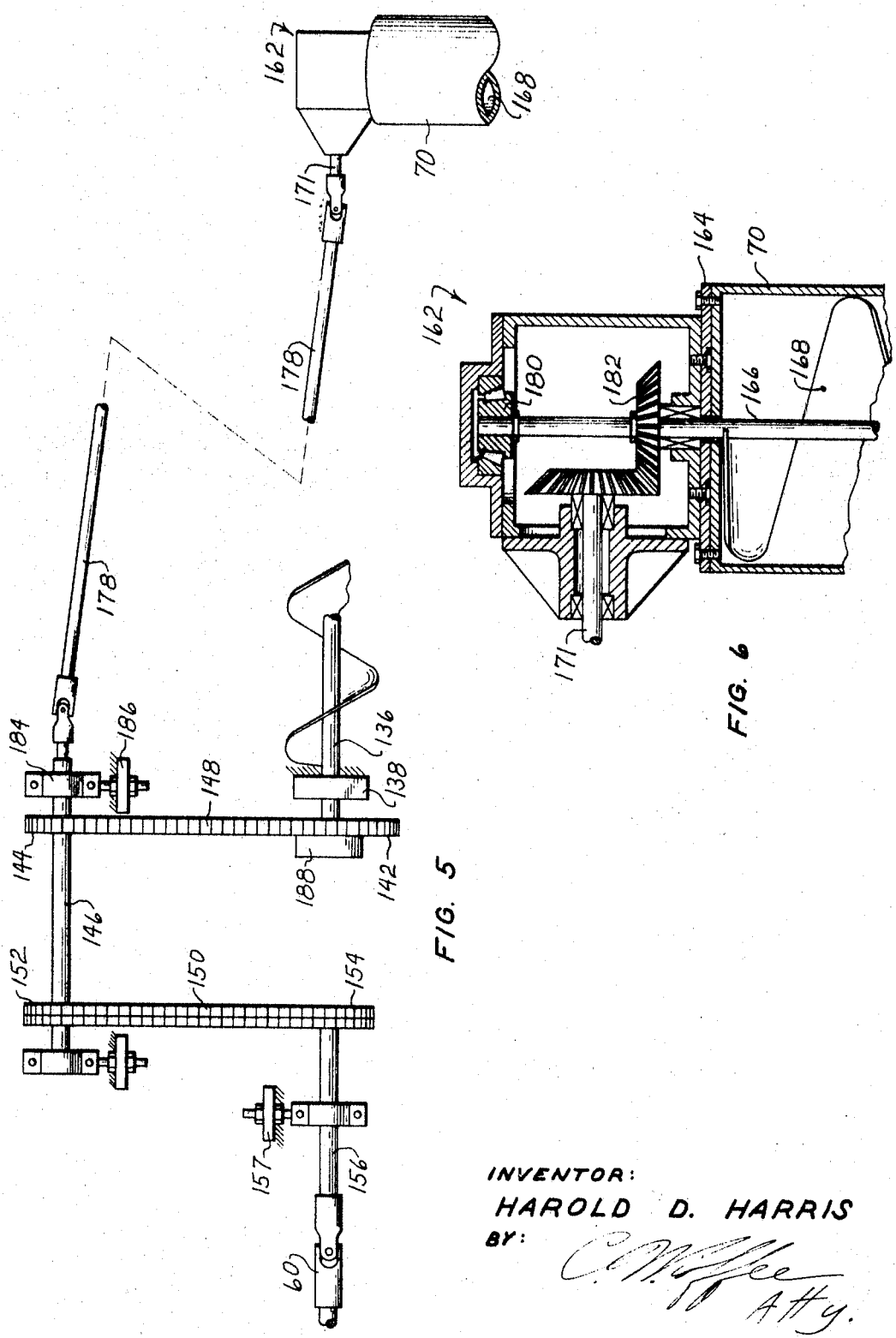

United States Patent Office 3,460,698
Patented Aug. 12, 1969

3,460,698
FARM CART
Harold D. Harris, Lubbock, Tex., assignor to Harris and Thrush Manufacturing Company, Lubbock, Tex., a corporation of Texas
Filed Mar. 4, 1968, Ser. No. 709,981
Int. Cl. B60p 1/40
U.S. Cl. 214—519    10 Claims

ABSTRACT OF THE DISCLOSURE

A cart receives grain from a combine while the combine is harvesting the grain and delivers it to a truck for transportation to an elevator. The grain is delivered from the cart by an auger driven by the power takeoff of the tractor pulling the cart.

BACKGROUND OF THE INVENTION

Field of the invention

This invention relates to land vehicles and more particularly to a cart for transporting and unloading granular material.

Description of the prior art

At the present time, nearly all grain is harvested by the use of a combine. Typically, these combines have a hopper that carries some grain. The hopper is unloaded by an auger into a truck and then the grain carried by the truck to an elevator. Sometimes the grain is removed from the combine into the bed of the truck while the combine is harvesting with the truck being driven through the field adjacent to the combine. However, because of the conditions of many of the fields, this is impractical and more commonly the truck is stationary at a turnrow and the combine driven to the truck, both being stationary while the contents of the hopper of the combine is unloaded into the truck by an auger.

SUMMARY OF THE INVENTION

I have invented a cart which is towed by an ordinary farm tractor beside the combine so that the combine hopper may be emptied into the cart while the combine continues to harvest grain. The cart is then moved by the tractor to a stationary truck on the turnrow and the cart emptied into the truck. The capacity of the cart is three or four times the capacity of the combine hopper and, therefore, the cart may be used to receive grain from three or four combines before emptying its contents into the truck, thus speeding up the general harvesting operation.

The cart itself has two large tires and is adapted to be moved over rough terrain and cultivated fields. The cart has a sloping bottom. The bottom of the cart has right and left hand augers to deliver the grain to the middle of the cart at high speed. The grain is removed to an elevating auger which delivers it to the truck. All the augers are powered from the power takeoff of the tractor.

An object of this invention is to transport granular material.

Another object is to transport grain from a combine to a truck, and thence to an elevator.

Further objects are to achieve the above with a device that is sturdy, lightweight, compact, durable, simple, safe, versatile, reliable and efficient, yet inexpensive and easy to manufacture, operate, and maintain.

Still further objects are to achieve the above with a method that is safe, rapid, efficient and inexpensive and does not require skilled people to adjust, operate, and maintain.

The specific nature of the invention, as well as other objects, uses, and advantages thereof, will clearly appear from the following description and from the accompanying drawing, the different views of which are not to the same scale.

BRIEF DESCRIPTION OF THE DRAWING

FIG. 1 is a top plan view, with parts broken away for clarity, of a cart according to this invention.

FIG. 2 is a sectional view of the cart taken substantially on line 2—2 of FIG. 1.

FIG. 5 is a schematic plan view of a modified drive train, the supporting structure of the cart not shown for clarity.

FIG. 6 is a sectional view of the gear box shown in FIG. 5.

DESCRIPTION OF THE PREFERRED EMBODIMENT

Figure 3:
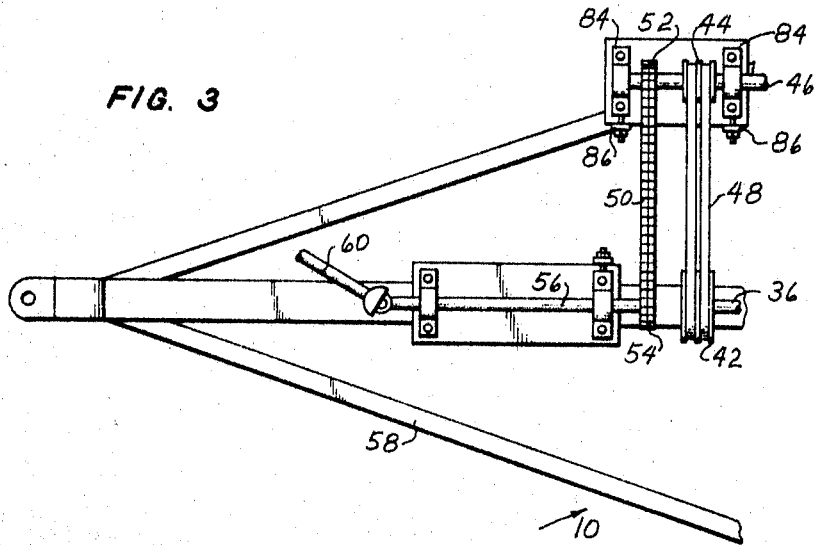
FIG. 3 is an enlarged top plan view of a part of the tongue showing details of the drive mechanism.

Cart 10 has two wheels 12 with pneumatic tires. The wheels are attached to axle 14 which is a portion of undercarriage 16. The bin of the cart includes the front wall 18 and the end wall 20. The upper halves of the sides are formed by straight vertical panels 22 and 24. The lower half of the sides slope inward or downward and toward the center to form a funnel so that all the contents of the bin is funneled to auger 30 at the front of the cart and auger 32 at the rear of the cart. The sides which slope inward are designated as panels 26 and 28. Cover 34 is attached to the panels 26 and 28 and extends over augers 30 and 32. There is space between the cover 34 and the panels for the grain to feed to the augers. The augers 30 and 32 are carried upon a common shaft 36 which is horizontal and aligned with the direction of the draft. The shaft is supported by bearing 38 in the bottom of the front wall 18 and bearing 40 in the bottom of the end wall 20. The auger 30 has a right-hand flight thereon and the auger 32 left-hand flight so that material in the bin is moved toward the center of the bin upon rotation of the shaft 36.

The shaft is rotated by double sheave 42, which is mounted upon shaft 36, forward of the bearing 38. Sheave 42 is driven from sheave 44 upon jack shaft 46 through two V belts 48. The shaft 46 itself is driven by chain 50 with sprocket 52 upon the forward end of the shaft 46 and sprocket 54 upon the rear of drive shaft 56. The drive shaft 56 is mounted by suitable bearings upon tongue 58 of the undercarriage 16. The forward end of drive shaft 56 has tumbler shaft 60 which is well known to the art and provides a convenient means for driving the drive shaft 56 from the power takeoff of the tractor 90.

The jack shaft 46 is parallel to the drive shaft 56 and to the auger shaft 36. It extends along the undercarriage 16 to one side of the panel 28. At the rear it is supported by rear main bearing 62.

A plurality of sheaves 64 are keyed to the jack shaft 46 to carry a plurality of V belts 66 by which elevating auger 68 is driven. The elevator or auger is contained within tube 70 which extends from the bottom of panels 26 and 28 of the cart 10 to where it exits through upper side panel 22. There the auger 68 is supported by bearing 72. Bolted to side panel 22 is extension tube 74 carrying extension auger 76 whereby the grain is conveyed to a sufficient height to be emptied into truck 94. Plurality of sheaves 78 are keyed to the lower end of the auger 68 and operate with V belts 66 to drive the elevating auger 68 and the extension auger 76.

The rear main bearing 62 is carried on bracket 82 with elongated slots by which the bracket is bolted to a member of the undercarriage 16. Ear 80 is welded to the undercarriage adjacent to the bracket 82. A threaded bolt extends through the ear 80 and bears against the bracket 82 whereby the position of the shaft 46 may be adjusted, thereby adjusting the tension upon the V belts 66. Obviously for this adjustment the ear 80 is located on the side of the shaft toward the auger 68. Also, forward main bearings 84, through which the forward end of shaft 46 is journaled, are likewise carried on a bracket which is attached to the undercarriage by slotted holes and it likewise has an adjacent ear 86 welded to the undercarriage through which extends a threaded bolt to adjust the position of the shaft at this point thereby adjusting the tension of the drive chain 50 and belts 48. By similar arrangement, the position of the bearings carrying the drive shaft 56 may be adjusted.

It is necessary that the elevating auger 68 have a greater capacity than the combined capacities of the bottom augers 30 and 32. If this were not so, the bottom augers would deliver more grain to the center of the cart than the elevating auger removed and there would be an undesirable compression of grain in this area. I have found that if the bottom augers 30 and 32 are nine inch augers and rotated at about 450 r.p.m. and the elevating auger is a twelve inch auger rotating at about 650 r.p.m., it is possible to remove a loan of over fifteen thousand pounds of grain in less than three minutes.

Figure 4:
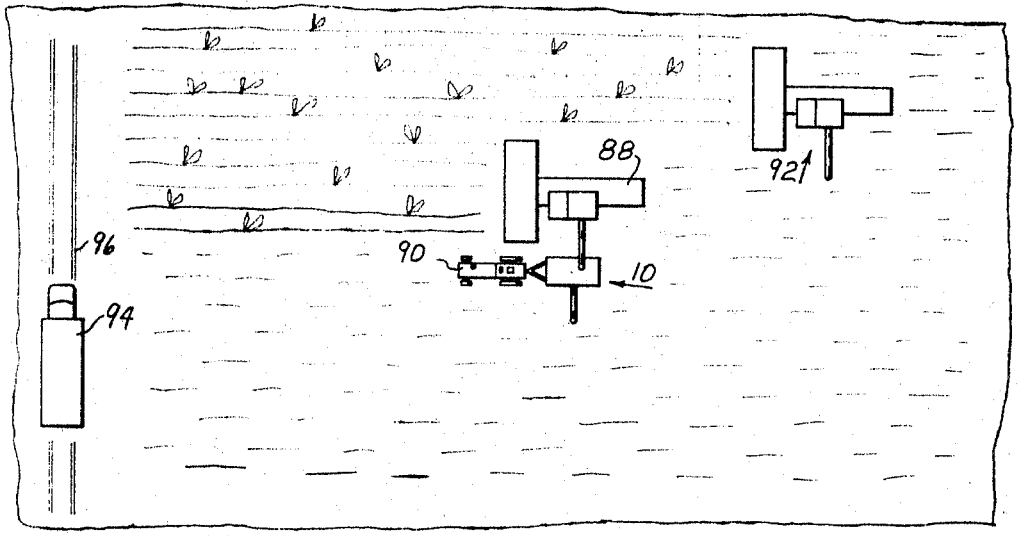
FIG. 4 is a schematic representation of a field with two combines, a cart, and a truck on the turnrow.

Referring to FIG. 4, it may be seen a typical operation wherein combine 88 is harvesting in the field with the tractor 90 pulling cart 10 adjacent to the combine so that the combine hopper is being emptied into the cart 10. Thereafter, the cart with its towing tractor 90 may be moved to a second combine 92 to collect the grain from its hopper before going to truck 94 awaiting on the turnrow 96 to discharge the grain from the cart into the truck to finish the first portion of the ultimate journey of the grain from the stalk in the field to the elevator.

A modified form of the drive train is illustrated in FIGS. 5 and 6. As in the previous embodiment, the auger shaft 136 is journaled through the bottom of the front wall by bearing 138, and journaled to rear wall by a bearing not shown. These bearings are fixed to the walls with little or no adjustment as to positions. The shaft 136 is driven by chain 148 from jack shaft 146. The chain 148 runs from sprocket 142 upon the shaft 136 to sprocket 144 upon the jack shaft 146. The jack shaft 146 is journaled within forward main bearing 184. The bearing is mounted upon a bracket which has slotted holes therein and is securely bolted to the tongue of the cart. Thereby the jack shaft 146 may be adjusted as to position and securely held in place by adjustment screws extending through ear 186 which is attached as by welding to the tongue. The jack shaft is driven by double chain 150 which runs on sprocket 152 attached to the jack shaft 146 and sprocket 154 attached to the drive shaft 156. The drive shaft is journaled within bearings which are mounted upon a bracket having slotted holes therein and they likewise are securely held in adjusted position by a screw threaded through ear 157 attached to the tongue. As in the previous embodiment, the main drive shaft 156 is powered through tumbler shaft 60 which is itself powered from the power takeoff of the tractor. It is necessary to have the position of the drive shaft 156 adjustable in order to maintain the proper tension upon chain 150.

According to the embodiment of FIG. 5, the elevating auger 168 is driven through gear box 162, which is bolted to flange 164 which forms a bottom of the tube 70. (In this regard, FIG. 6 is upside down to correspond with FIG. 5.)

The gear box 162 is a right-angle gear box having the auger shaft 166 extending outward and in alignment with the elevating auger 68. Also, the gear box has another shaft 171 extending at right angles thereto which is connected to tumbler shaft 178 which has the customary U joints and sliding joints so that it may be driven by the jack shaft 146 although the gear box shaft 171 and the jack shaft are not in exact alignment. The auger shaft 166 is bolted directly to the auger 168 and thrust bearing 180 in the gear box 162 receives all of the thrust from the weight of the auger 168 and the weight of the grain being carried by the auger 168 and, also, the thrust resulting from the power being transmitted through the beveled gears 182 within the gear box 162.

Slip clutch 188 is mounted upon sprocket 142, and interconnects the shaft 136 with the sprocket 142. Therefore, in the event of some difficulties and the grain becomes choked, the elevating auger will be operated through the gear box 162 inasmuch as there are no clutches between the drive shaft 156 and the auger shaft 166. However, hte auger shaft 136 will not be rotated because of the slippage in slip-clutch 188, therefore, the material can be cleaned out, usually by continued operation of the equipment and there is no danger of damaging the equipment nor is there any necessity for long delays while the material is removed from the augers and elevators.

It will be apparent that the embodiments shown are only exemplary and that various modifications can be made in operation, construction, materials, and arrangement within the scope of the invention as defined in the appended claims.

I claim as my invention:

1. In a cart for receiving granular material from a first location and delivering it to a second location having
   (a) a rigid undercarriage,
   (b) a tongue rigidly attached to the undercarriage,
   (c) an axle rigidly attached to the undercarriage,
   (d) a wheel on each end of the axle,
   (e) pneumatic tires on the wheels, and
   (f) a bin on the undercarriage;
   (g) the improvement comprising in combination:
   (h) the bin having sides which slope inward to the center thus funneling the material to the center,
   (j) an auger shaft extending along the bottom of the bin from front to rear,
   (k) an auger on the front portion of the auger shaft with flights turned in a first direction,
   (m) an auger on the rear portion of the auger shaft with flights turned in a second direction,
   (n) drive means for rotating the auger shaft whereby granular material in the bin is moved to the middle of the bin,
   (o) an elevating discharge auger extending from the bottom center of the bin to the outside through one of the sides of the bin, and
   (p) drive means for rotating the elevating discharge auger to elevate granular material upward to outside of the bin.

2. The invention as defined in claim 1 with the additional limitation of
   (r) a drive shaft journaled to the undercarriage, and
   (s) tumbler means for driving the drive shaft from a tractor attached to said tongue of the cart,
   (t) said drive shaft forming a portion of said drive means for rotating the auger shaft and a portion of said drive means for rotating the elevating auger.

3. The invention as defined in claim 1 with the additional limitation of
   (r) a jack shaft journaled to the undercarriage,
   (s) said drive means for rotating the auger shaft including gearing from said jack shaft to said auger shaft, and
   (t) said drive means for rotating the elevating auger including gearing from said jack shaft to said elevating auger.

4. The invention as defined in claim 3 with the additional limitation of
   (u) a jack shaft bearing,
   (v) a slotted bracket carrying said jack shaft bearing, (w) said jack shaft journaled in said jack shaft bearing, and
(x) screw means for interconnecting the undercarriage and said bracket for adjusting the position of said jack shaft bearing and thus adjusting the position of said jack shaft.

5. The invention as defined in claim 3 with the additional limitation of
(u) a drive shaft journaled to the undercarriage,
(v) tumbler for driving the drive shaft from a tractor attached to said tongue of the cart, and
(w) means for driving said jack shaft from said drive shaft.

6. The invention as defined in claim 5 with the additional limitation of
(x) a jack shaft bearing,
(y) a slotted bracket carrying said jack shaft bearing,
(z) said jack shaft journaled in said jack shaft bearing, and
(aa) screw means for interconnecting the undercarriage and said bracket for adjusting the position of said jack shaft bearing and thus adjusting the position of said jack shaft.

7. The invention as defined in claim 5 with the additional limitation of
(x) a drive shaft bearing,
(y) a slotted bracket carrying said drive shaft bearing,
(z) said drive shaft journaled in said drive shaft bearing,
(aa) screw means for interconnecting the undercarriage and said bracket for adjusting the position of said drive shaft bearing and thus said drive shaft.

8. The invention as defined in claim 7 with the additional limitation of
(bb) a jack shaft bearing,
(cc) a slotted bracket carrying said jack shaft bearing,
(dd) said jack shaft journaled in said jack shaft bearing, and
(ee) screw means for interconnecting the undercarriage and said bracket for adjusting the position of said jack shaft bearing and thus adjusting the position of said jack shaft.

9. The invention as defined in claim 1 with the additional limitation of
(q) wherein said drive means for rotating the auger shaft includes a slip-clutch for permitting the drive to be inactivated in the event of an overload.

10. The invention as defined in claim 1 with the additional limitation of said drive means rotating the elevator auger including:
(q) a tube surrounding said elevating auger,
(r) a right-angle-gear box having two shafts attached to said tube,
(s) said elevator auger attached to one of the shafts of the right-angle-gear box and
(t) a thrust bearing in the elevating auger,
(u) said thrust bearing carrying the thrust of the elevator auger and all thrust associated therewith.

References Cited

UNITED STATES PATENTS

| | | | |
|---|---|---|---|
| 2,894,733 | 7/1959 | Wosmek | 214—83.32 XR |
| 3,391,808 | 7/1968 | Barber et al. | 214—522 XR |
| 2,960,320 | 11/1960 | Heider. | |

ALBERT J. MAKAY, Primary Examiner

214—83